United States Patent [19]
Vohra et al.

[11] Patent Number: 5,903,349
[45] Date of Patent: May 11, 1999

[54] FIBER OPTIC ACCELEROMETER SENSOR AND A METHOD OF CONSTRUCTING SAME

[75] Inventors: Sandeep T. Vohra, Crofton, Md.; Bruce Danver, Alexandria, Va.; Alan Tveten, Ft. Washington, Md.; Anthony Dandridge, Burke, Va.

[73] Assignee: The United States of America as represented by the Secretary of the Navy, Washington, D.C.

[21] Appl. No.: 08/845,244

[22] Filed: Apr. 21, 1997

[51] Int. Cl.$^6$ ........................................... G01B 9/02
[52] U.S. Cl. .................. 356/345; 73/514.01; 250/227.19
[58] Field of Search .................... 356/35.5, 345, 356/355; 73/514.01; 250/227.19, 227.27; 367/153

[56] References Cited

U.S. PATENT DOCUMENTS

| | | | |
|---|---|---|---|
| 4,959,539 | 9/1990 | Hofler et al. ........................ | 250/227.19 |
| 5,287,332 | 2/1994 | Lea .......................................... | 356/345 |
| 5,317,929 | 6/1994 | Brown et al. ............................. | 73/517 |
| 5,369,485 | 11/1994 | Hofler et al. ............................. | 356/345 |

OTHER PUBLICATIONS

Jordan et al., A Fiber Optic Hydrophone, .w.ee.washington-.EDU/lasers/ee48895/ Project/robj/proposal/e488phr.htm, Feb. 12, 1996.

Brown et al., An Interferometric Fiber Optic Accelerometer, SPIE vol. 1367, Fiber Optic and Laser Sensors VIII, pp. 282–288, 1990.

Vohra et al., High Preformance Fiber Optic Accelerometers, Proc. 11th Optical Fiber Sensors Conf., Sapporo, Japan, May 1996.

Brown et al., Fiber Optic Flexural Disk Microphone, Fiber Optic and Laser Sensors VI SPIE vol. VI, pp. 172–182; 1988.

*Primary Examiner*—Samuel A. Turner
*Attorney, Agent, or Firm*—Thomas E. McDonnell; Charles J. Stockstill

[57] ABSTRACT

The interferometric fiber optic accelerometer is viewed as a mass-spring transducer housed in a sensor case. The sensor case is attached to a moving part whose motion is inferred from the relative motion between the mass and the sensor case. A flexural disk is housed in a sensor case which is accelerated in a direction normal to the plate surface. The plate undergoes displacement resulting in strains on the plate surface. A coil of optical fiber, made to be part of an optical interferometer, is attached to the flexural disk, the strain from the disk is transferred to the fiber thus changing the path length of the fiber interferometer. The interferometer output in demodulated providing the acceleration response. The design of the accelerometer housing is such that it is highly immune to extraneous signals, i.e., dynamic and hydrostatic pressure. Fabrication of the optical fiber coils is accomplished by winding the optical fiber, with a specially designed chuck to form reference and sensing fiber coils which are then bonded to the flexural disk to form the accelerometer.

3 Claims, 5 Drawing Sheets

FIBER OPTIC ACCELEROMETER SENSOR AND A METHOD OF CONSTRUCTING SAME

BACKGROUND OF THE INVENTION

1. Field of the Invention

This invention refers generally to an acceleration sensor and more specifically to a high performance fiber optic interferometric acceleration sensor.

2. Description of the Related Art

An accelerometer is typically viewed as a mass-spring transducer housed in a sensor case with the sensor case attached to a moving part whose motion is inferred from the relative motion between the mass and the sensor case. The relative displacement of the mass being directly proportional to the acceleration of the case and therefore the moving part.

One type of accelerometer is a piezoelectric based electronic accelerometer. However, it tends to suffer from several major drawbacks when faced with the continuing stricter demands of the industry. Most higher performance piezoelectric accelerometers require power at the sensor head. Also, multiplexing of a large number of sensors is not only cumbersome but tends to occur at significant increase in weight and volume of an accelerometer array.

Another type is the interferometric fiber optic accelerometers based on linear and nonlinear transduction mechanism, circular flexible disks, rubber mandrels and liquid-filled-mandrels. Some of these fiber optic accelerometers have displayed very high acceleration sensitivity (up to $10^4$ radians/g), but tend to utilize a sensor design which is impracticable for many applications. For instance, sensors with a very high acceleration sensitivity typically tend to have a seismic mass greater than 500 grams which seriously limits the frequency range in which the device may be operated as an accelerometer and are so bulky that their weight and size renders them useless in many applications. Other fiber optic accelerometers suffer either from high cross-axis sensitivity or low resonant frequency or require an ac dither signal and tend to be bulky (>10 kg) and expensive. For many applications, the fiber optic sensor is expected to have a flat frequency response up to several kHz (i.e., the device must have high resonant frequency), high sensitivity, be immune to extraneous measurands (e.g., dynamic pressure), be lightweight and easily configurable in an array (i.e., easy multiplexing).

SUMMARY OF THE INVENTION

The object of this invention is to provide an accelerometer that is highly immune to dynamic pressure signals and having excellent directivity that may be produced cheaper than those currently in use.

Another objective is to produce an accelerometer that is immune to electromagnetic interference and is of a light weight.

Another objective is to produce an accelerometer that may be easily multiplexed to provide for large arrays of accelerometers.

These and other objectives are accomplished utilizing an interferometric fiber optic accelerometer mounted on a circular flexural disk. The accelerometer is viewed as a mass-spring transducer housed in a sensor case. The sensor case is attached to a moving part whose motion is inferred from the relative motion between the mass and the sensor case. In this invention, a flexural disk is housed in a sensor case which is accelerated in a direction normal to the plate surface. The plate undergoes displacement resulting in strains on the plate surface. A coil of optical fiber, made to be part of an optical interferometer, is attached to the flexural disk, the strain from the disk is transferred to the fiber thus changing the path length of the fiber interferometer. The interferometer output in demodulated providing the acceleration response.

DESCRIPTION OF THE PREFERRED EMBODIMENTS

Figure 1:
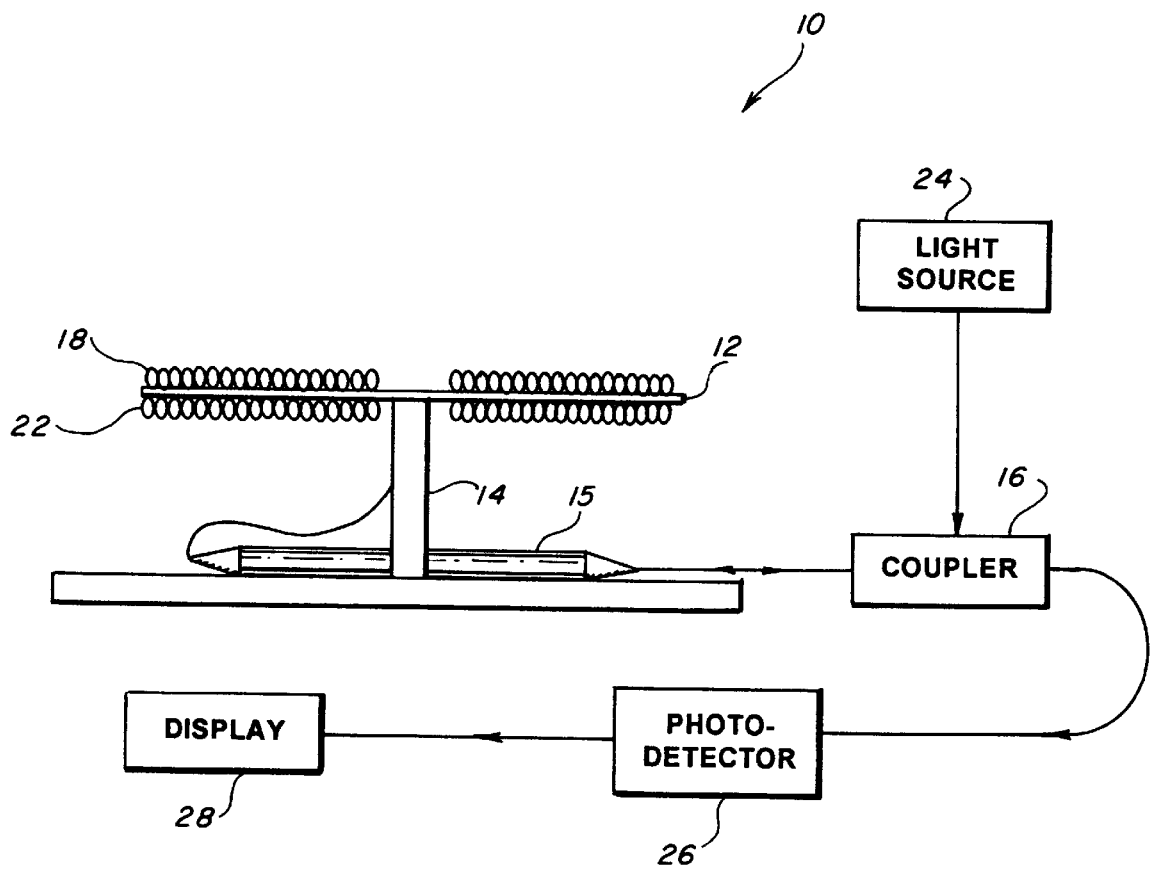
FIG. 1 shows a center supported flexural disk based fiber optic accelerometer sensor.

The high performance accelerometer sensor 10, as shown in FIG. 1, utilizes a center 14 supported flexural disk 12 approach which provides a sensor 10 design which has low static and dynamic pressure sensitivity while maintaining high acceleration sensitivity. The resonant frequency and acceleration sensitivity of the accelerometer 10 are determined by the geometric shape, the disk 12 material and the type of support 14 provided to the disk 12. The resonant frequency of the accelerometer 10 is designed to be such that the device is to be operate below its first primary resonance. The acceleration induced strain in the disk 12 is typically measured by high sensitivity interferometric methods. The flexural disk 12 based design along with the high strain sensitivity fiber optic interferometer (e.g., Michelson, Mach-Zehnder, Sagnac, in-line reflectometric, etc.) formed by an optical fiber sensing and reference arm 18 and 22, respectively, wrapped onto the flexural disk 12 at the heart of the fiber optic acceleration sensor 10.

In the push-pull configuration, the fiber optic acceleration sensor 10 is comprised of two optical fiber coils forming the sensing arm 18 and the reference arm 22 that comprise each leg of the interferometer, preferably a Michelsen type interferometer. The sensor and reference arms 18 and 22, respectively, are epoxied to the top and bottom, respectively, of the flexural disk 12 using a type of epoxy resin well known to those in the art. The flexural disk 12 is preferably made of aluminum, however other materials may be utilized. The optical fiber forming the sensing arm and reference arm 18 and 22, respectively, is preferably a single mode optical fiber having a core diameter equal to 6 microns and a cladding diameter equal to 80 microns made by Corning of Corning, N.Y.

As the sensor 10 body is accelerated in a direction normal to the disk 12 surface, the disk 12 deflects, thus resulting in strains on the upper and lower surfaces of the disk 12 which are equal in magnitude but 180 degrees out of phase. The acceleration-induced surface strain in the disk 12 changes the path length of the attached fiber 18 and 22 in a push-pull manner resulting in intensity modulation of an optical light from an optical light source 24 at the photodetector (not shown) where it is converted into an electrical signal. The output of the interferometer formed by the sensing and reference arms 18 and 22, respectively, can be detected by any one of many techniques, e.g., the phase generated carrier technique.

Figure 2:
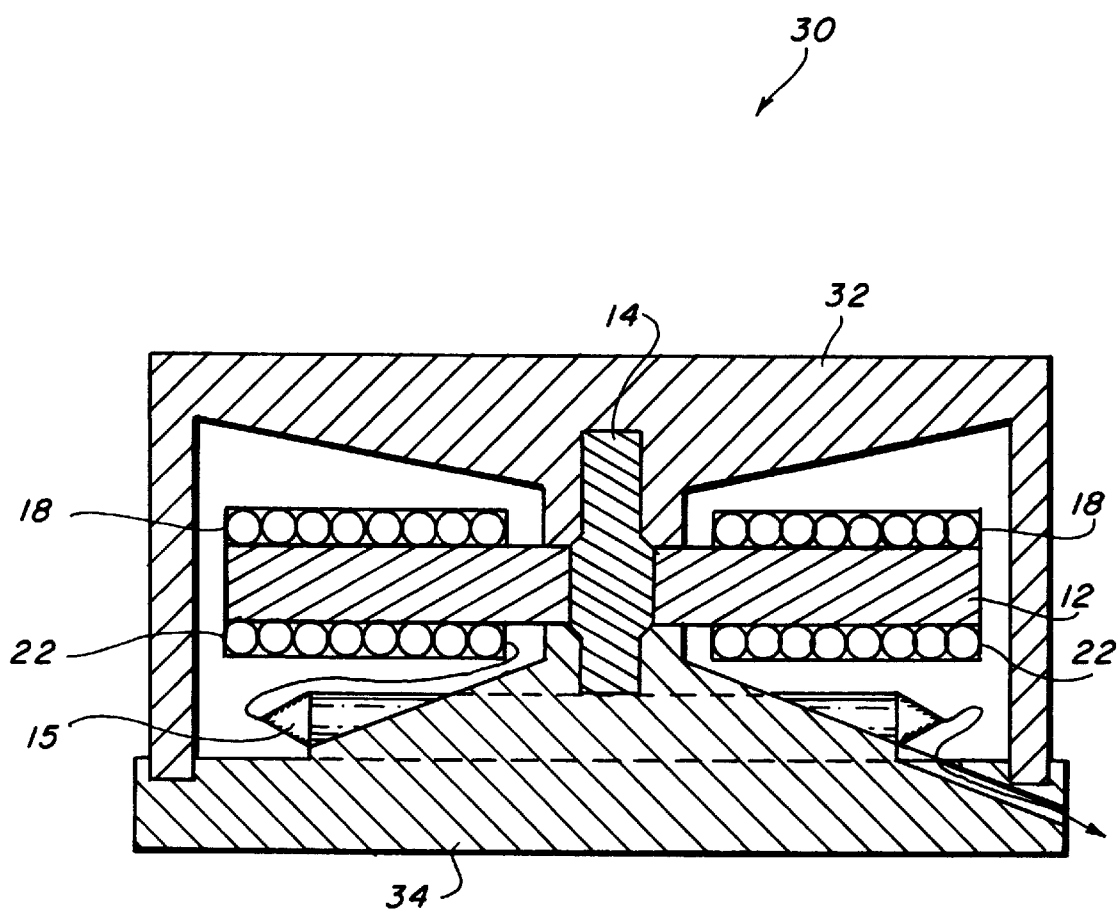
FIG. 2 shows a flexural disk based fiber optic accelerometer sensor within a housing.

The invention described above, by itself, would not only provide an unprotected sensor but will also be extremely sensitive to extraneous measurands. Therefore, it is very important that the flexural disk and the interferometer be housed in an appropriate shell or housing 30, as shown in FIG. 2. In certain applications the details of the housing design is of prime significance. It is well known to those skilled in the art that any accelerometer, especially those designed for "deep" underwater applications, should be packaged in such a manner that it can withstand hydrostatic pressures on the order of several hundred pounds per square inch. In addition, certain applications require that the accelerometer be insensitive to acoustic (i.e., dynamic pressure) signals, must be sufficiently stiff so as to not act as a pressure release surface, must not scatter any incident or radiated acoustic fields and must not introduce any unwanted in band resonances. Above all, the sensor is expected to be neutrally buoyant in order to accurately measure the underwater velocity of compliant materials. These opposing sets of requirements introduce severe constraints on the design and construction of the sensor housing 30. However, achieving these requirements will ensure that a high performance accelerometer sensor mounted on a compliant coating mounting surface will not change any reactive forces on the compliant coating and provide accurate measurement of acoustic signals.

Extreme care must be taken to ensure that the housing 30 design does not introduce any resonances in the band of interest. For instance, a simple cylindrical design, with flat lid and base, acting as a type of "pill-box" cover for the flexural disk 12 may introduce unwanted resonances in the frequency band of interest or be acoustically "soft" or both. The preferred housing 30 described herein is such that the lid 32 and the base 34 of the sensor housing 30 introduce no resonances in the frequency band of interest, while maintaining a high degree of acoustic signal isolation from the sensing part 10 (i.e., flexural disk 12 and fiber interferometer formed by the sensing and reference arms 18 and 22, respectively). FIG. 2 shows a preferred sensor housing 30 design with a tapered thickness lid 32 and base 34. The "pyramidal" or tapered shape of the lid 32 and base 34 ensures that the housing lid 32 and base 34 have maximum thickness in the center where flexing is maximal. Since the thickness is at a maximum in the middle, the flexing is minimized and the base 34 and the lid 32 introduce no resonances in the band of interest, while maintaining a high degree of acoustic signal isolation from the sensing part 10. This approach is particularly useful for the center supported flexural disk 12, as described herein, since the center support 14 of the disk 12 is directly coupled to the center of the base 34 and lid 32. The pyramidal shape also reduces total sensor 30 weight which helps towards the goal of neutral buoyancy. The overall volume and weight of the total sensor 30 design (flexural disk 12, fiber interferometer formed by the sensing and reference arms 18 and 22, respectively, and upper and lower housing 32 and 34, respectively) determines its neutral buoyancy.

Fabrication of an optical fiber coil for the optical fibers 18 and 22 is accomplished using a winding machine (not shown), preferably automatic, of a type well known to those practicing the art is used. At a minimum the winding apparatus should consist of a variable speed spindle with an adjustable chuck to hold a winding spool, an optical fiber length measuring device, an optical fiber storage spool, a tensioning system, and an optical fiber guide system with a V-groove guide wheel positioned about 1.5 inches above the winding spool.

Figure 3:
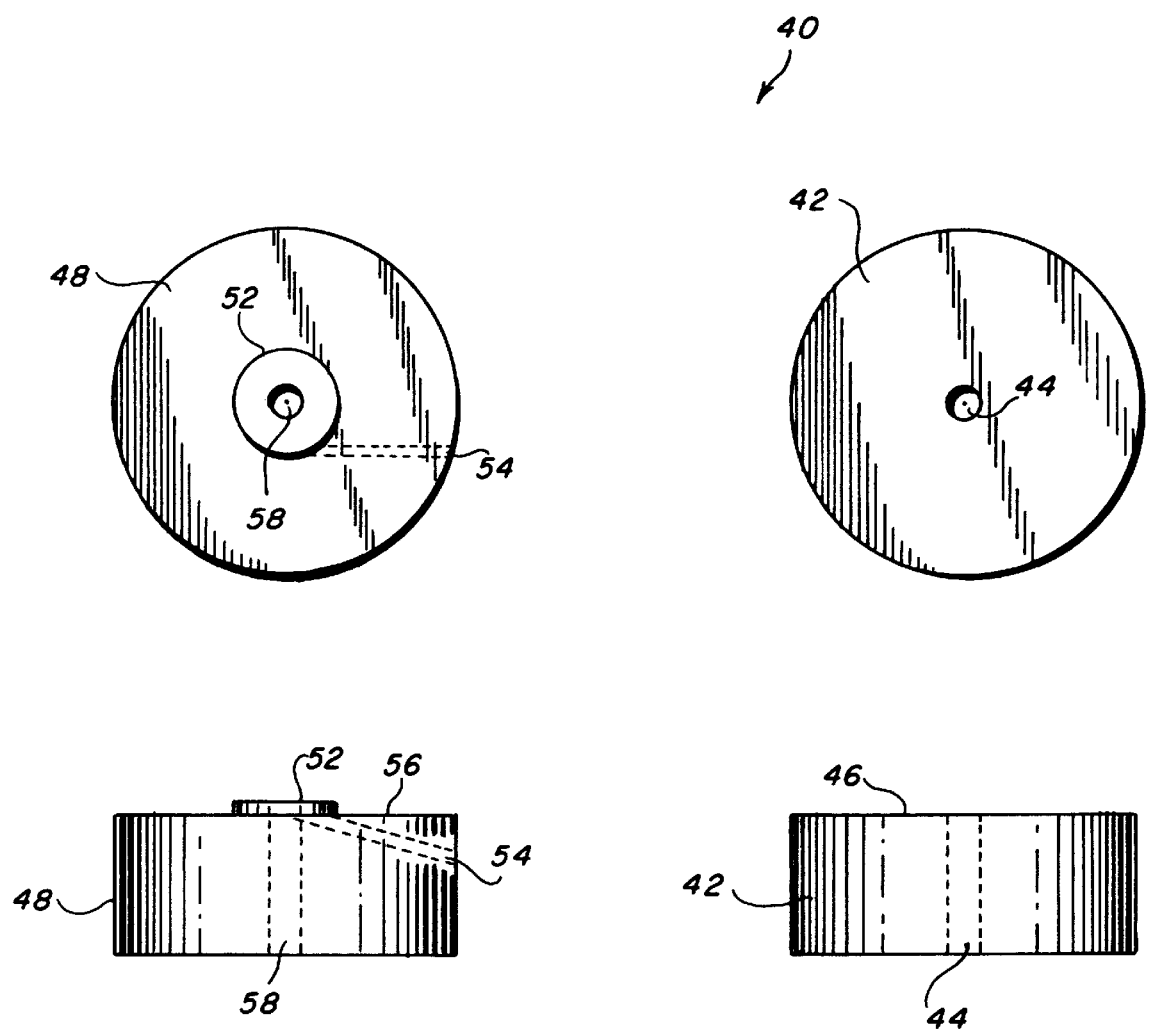
FIG. 3 shows a winding spool for winding an optical fiber onto a flexural disk.

The winding spool 40, as shown in FIG. 3, used to form an optical fiber coil for the optical fibers 18 and 22, is made of Plexiglass® to facilitate ultraviolet (UV) curing of a bonding agent utilized to affix the coils of the optical fibers 18 and 22 to form either a sensing arm 18 or reference arm 22 coil. The bonding agent should be such that its Young's modulus approaches that of the flexural disk. The dimensions of the winding spool 40 determine the optical coils thickness and its diameter. The winding spool 40 are split into two parts, one part 42 is an approximately one inch diameter cylinder having a nominal length of approximately 0.4 inches, with a hole 44 bored through the cylinder along its axis. The hole 44 is sized to allow for a slip fit of, preferably, a 8-32 cap headed screw (not shown) approximately 1.5 inches long. One end of the cylinder is made perpendicular to the axis of the cylinder 42 and one side 46 is polished to a fine finish utilizing polishing techniques well known to those skilled in the art. A second part 48 of the spool 40, similar to the first part 42 but having a raised center portion 52 approximately 0.3 inches in diameter so that when the two parts 42 and 48 of the spool 40 cylinder are mated together, the raised center portion 52 forms a hub around which the optical fiber 18 or 22 is wound to form an optical coil.

To facilitate running the optical fiber (not shown) out from the center of the spool 40, a hole 54, approximately 0.015 inches in diameter, enters the second part 48 of the spool 40 tangentially with respect to the raised center so that the optical fiber (not shown) can make a smooth transition from the hole 54 to the raised center section 52. For the first part 42 of the spool 40, the hole 54 for the optical fiber is right-handed, and for the second part 54 of the spool 40, the optical fiber hole 54 is left-handed. The hole 54 serves as a bonding agent block and only needs to be approximately 0.1 inches long, the remainder of the hole 54 may be larger.

Figure 4:
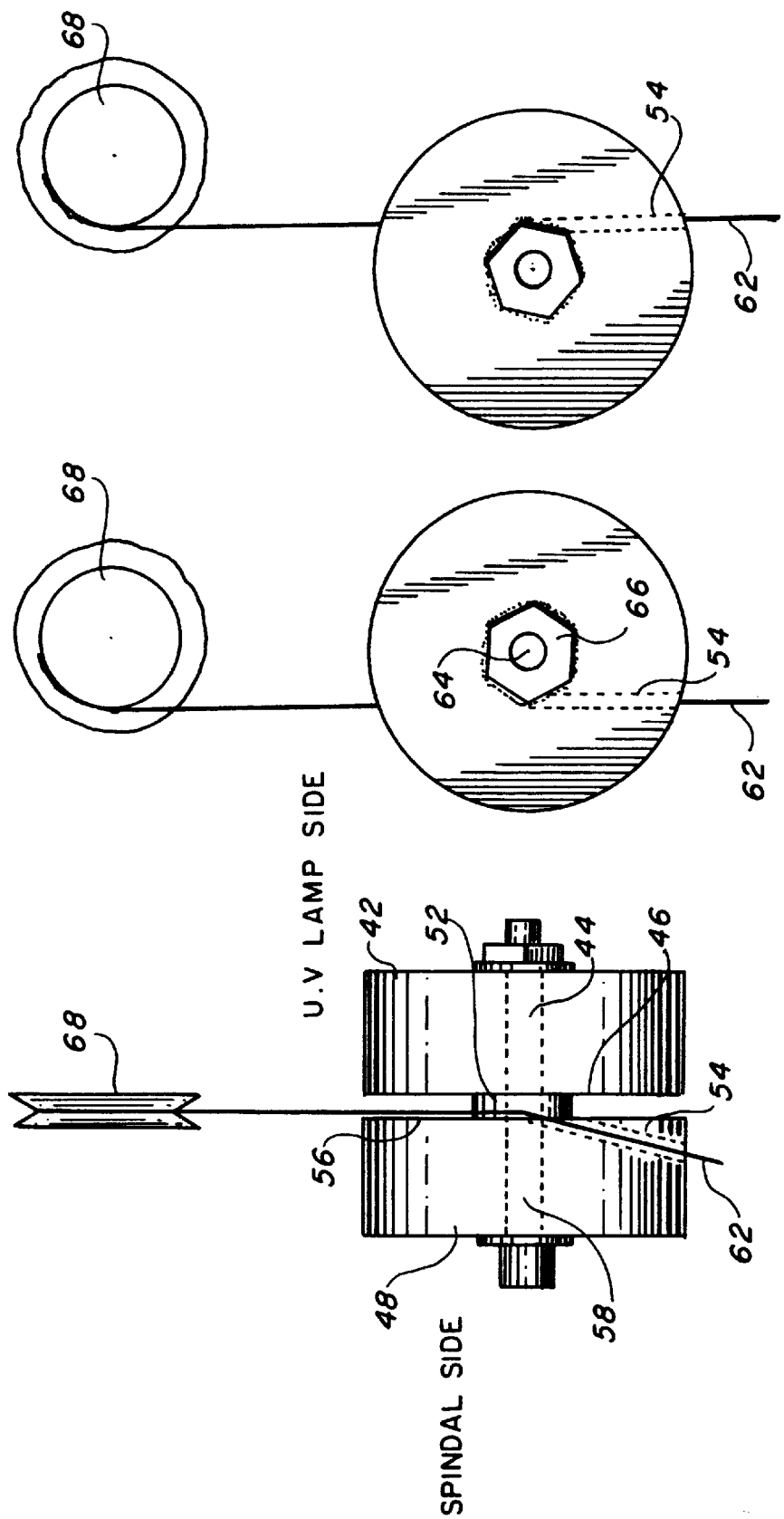
FIG. 4 shows the winding spool with optical fiber as mounted on the winding machine.

To prepare for the winding of the optical fiber coils, the two parts 42 and 48 of the winding spool 40 are sprayed with a mold release compound of a type that is well known to those skilled in the art, and allowed to dry completely. Winding tension of the optical fiber 62 is set typically to approximately 15 grams. As shown in FIG. 4, a loose end of the fiber 62 is inserted into the 0.015 inch hole 54 of the winding spool 40 and drawn through to a length of approximately 6 inches. The two parts 42 and 48 of the spool 40 are placed together with their polished sides 46 and 56 facing each other. A cap screw 64, preferably a 8-32 cap head screw approximately 1.5 inches long, is inserted into the center hole 44 and 58 of the spool 40 and a compatible nut 66 threaded onto the cap screw 64 to lock the two parts 42 and 48 together to form one spool 40. The nut 66 is tightened to a torque level approximating hand-tight. The spool 40 assembly, with the optical fiber 62 attached, is then inserted into the winding machine (not shown) and aligned so that the optical fiber 62 is exiting the 0.015 hole 54 smoothly over the center hub 52 with no sharp bends. The loose end of the optical fiber 62 coming out of the winding spool 40 is then taped to the winding spindle (not shown) with any commercial grade tape. The optical fiber 62 exiting over the hub 52 is then routed over the V-groove guide wheel 68 and any excess slack in the optical fiber 62 removed by engaging the optical fiber tensioning device (not shown). with the optical fiber 62 under tension, the V-groove guide wheel 68 is positioned so that the optical fiber 62 exits approximately midway between the polished faces 46 and 56 on the spool 40. The spindle (not shown) is kept so that the optical fiber 62 had made a half revolution around the hub 52. For the first part 52 of the spool 40, the optical fiber 62 will be coming over the side of the hub 52 closest to the operator. For the second part 48 of the spool 40, the optical fiber 62 will be behind the hub 52. This left and right side orientation allows the optical fiber 62 coil leads to exit the same side of the flexural disk 12 when assembled into a complete sensor 10.

Figure 5:
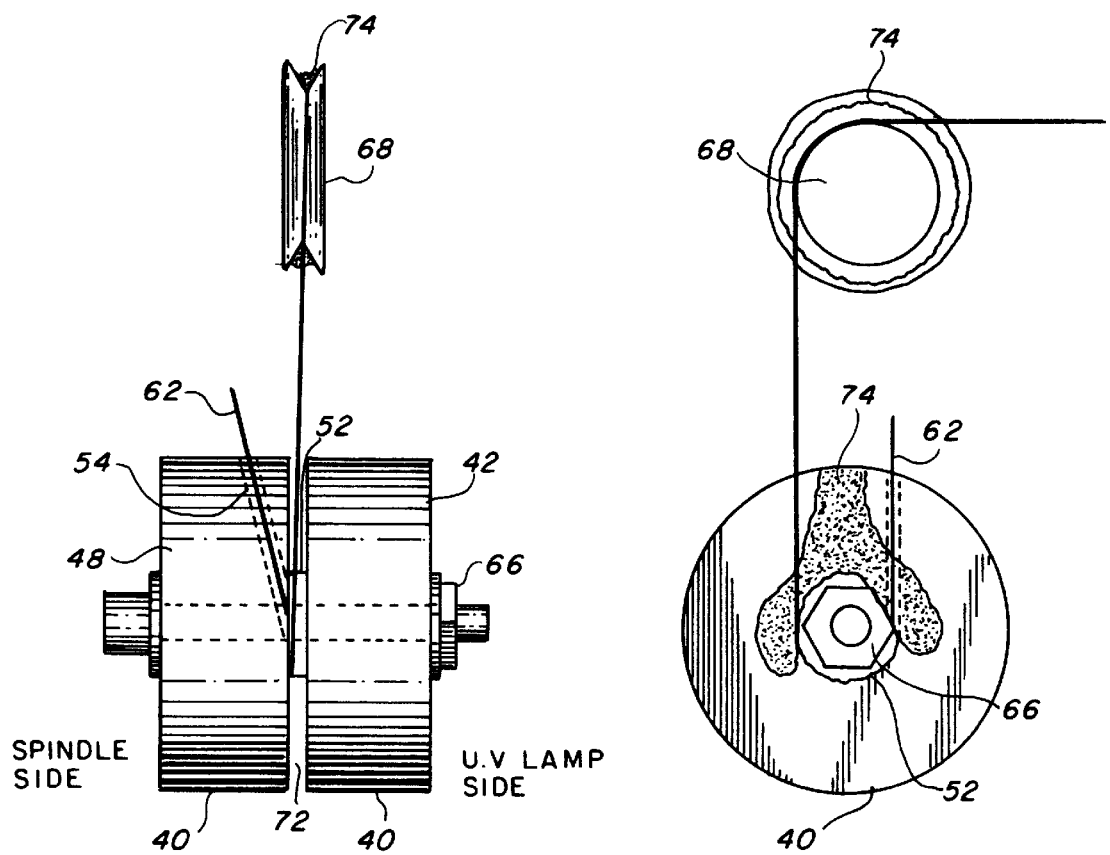
FIG. 5 shows the winding spool with optical fiber as mounted on the winding machine with epoxy feed.

As shown in FIG. 5, once the spool 40 has been rotated a half turn, the bonding agent 74 is wicked into the space between the walls 72 of the spool 40 at the top. As the bonding agent 74 wicks into the spool 40, additional bonding agent 74 is added to the guiding wheel V-groove 68. This is accomplished by dripping the bonding agent 74 on top while rotating the wheel so that an even distribution of the agent 74 covers the circumference of the V-groove 68. As the optical fiber 62 plays out over the guide wheel 68, it carries bonding agent 74 into the spool 40 with it. This insures that all of the optical fiber 62 is coated with the bonding agent 74 as it enters the spool 40 at the start of the winding process. When the bonding agent 74 has wicked half way around the hub 52, winding may be started.

The rotation speed for winding should be set to a rotation rate of approximately 110 RPM. This will ensure that the bonding agent 74 is distributed completely around the hub 52. Once this distribution of bonding agent 74 completely around the hub 54 has been accomplished, the rotation rate may be lowered. As the optical fiber 62 accumulates in the spool 40, excess bonding agent 74 will be forced to the outer edge of the spool 40 which can be removed during the winding process with a swab.

The optical fiber 62 length should be monitored during the winding process. When the length is within one meter of the desired final total length, the rotation rate should be lowered still further until the desired final length is reached, at which time the winding process is stopped. All excessive bonding agent 74 is then removed from the outer edge of the spool 40 and allowed to cure. The optical fiber coil 18 or 22 is cured, preferably until it can be ensured that the optical fiber coil 18 or 22 will hold its shape and still be easily removed from the spool 40. When completely cured, the optical fiber coil 18 or 22 should appear slightly yellow in color and be very hard.

The invention described herein is not only applicable to underwater acoustics but the principles described are also applicable in such applications as transient signal monitoring, vibration monitoring in aerospace applications, machinery monitoring on ships and industrial complexes, and for general purpose structural monitoring. The fully packaged sensors described herein are all-optical, have a higher sensitivity and lower self-noise than their conventional counterparts, are lightweight, have broad frequency response and can be easily incorporated into arrays. The accelerometers are highly immune to dynamic pressure signals (i.e., acoustics) and have excellent directivity (i.e., they have extremely low cross-axis sensitivity). Mass production of the described sensor design produces a unit more cheaply than the costs of their conventional counterparts (e.g., piezo-ceramic based accelerometers).

It will be understood by those skilled in the art that still other variations and modifications are possible and can be affected without detracting from the scope of this invention as defined in the claims.

What is claimed is:

1. An accelerometer comprised of:

an optical fiber sensing arm and a reference arm cylindrically wound onto a flexural disk forming a fiber optic interferometer;

as the fiber optic interferometer is accelerated in a direction normal to the disk surface, the disk deflects, thus resulting in strains in the sensing and reference arms, which are equal in magnitude but 180 degrees out of phase, that induce changes in the path length of the sensing and reference arms resulting in an intensity modulation of an applied optical light that is detected utilizing a phase generated carrier technique; and means for center supporting the flexible disk within a housing directly coupled to a base and lid of the housing at a center point of the housing.

2. An accelerometer comprised of:

an optical fiber sensing arm;

an optical fiber reference arm;

said sensing and reference arm cylindrically wound onto a flexural disk forming a fiber optic interferometer;

an optical light source producing an optical light to be applied to the fiber optic interferometer;

as the fiber optic interferometer is accelerated in a direction normal to the disk surface the disk deflects resulting in strains in the sensing and reference arms which are equal in magnitude, but 180 degrees out of phase, inducing changes in path length of the sensing and reference arms, resulting in an intensity modulation of the optical light that is detected by a phase generated carrier technique;

means for center supporting the flexible disk within a housing directly coupled to a base and lid of the housing at a center point of the housing;

a photodetector to convert the optical intensity modulation into an electrical signal.

3. An accelerometer comprised of:

an optical fiber sensing arm;

an optical fiber reference arm;

said sensing arm and reference arm cylindrically wound onto a flexible disk forming a fiber optic interferometer;

an optical light source producing an optical light to be applied to the fiber optic interferometer;

a housing encompassing the fiber optic interferometer so configured as to introduce no resonances in the frequency band of interest having a lid and base with a pyramidally-shaped interior with a tapered thickness forming the upper and lower portions, respectively, so positioned that the maximum thickness of the upper and lower portions is in the center where flexing of the fiber optic interferometer is maximal while maintaining acoustic signal isolation from the interferometer;

means for center supporting flexible disk forming the fiber optic interferometer within the housing directly coupled to the center of the base and lid;

as the fiber optic interferometer is accelerated in a directional normal to the disk surface the disk deflects, thus resulting in strains in the sensing and reference arms which are equal in magnitude but 180 degrees out of phase that induces changes in the path length of the sensing and reference arms resulting in an intensity modulation of the optical light that is detected by a phase generated carrier technique; and a photodetector to convert the optical intensity modulation of the optical light into electrical energy.

* * * * *